US008788617B2

(12) United States Patent
Cardozo

(10) Patent No.: US 8,788,617 B2
(45) Date of Patent: Jul. 22, 2014

(54) COOKIES STORED IN A CLOUD COMPUTING ENVIRONMENT

(75) Inventor: Kenneth Cardozo, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 205 days.

(21) Appl. No.: 13/420,967

(22) Filed: Mar. 15, 2012

(65) Prior Publication Data

US 2013/0246563 A1 Sep. 19, 2013

(51) Int. Cl.
*G06F 15/16* (2006.01)

(52) U.S. Cl.
USPC .......................................................... 709/217

(58) Field of Classification Search
USPC ......................................... 709/217, 219, 224
See application file for complete search history.

(56) References Cited

U.S. PATENT DOCUMENTS

| | | | | |
|---|---|---|---|---|
| 2005/0021731 | A1* | 1/2005 | Sehm et al. | 709/224 |
| 2008/0216153 | A1* | 9/2008 | Aaltonen et al. | 726/3 |
| 2008/0281921 | A1* | 11/2008 | Hunt | 709/206 |
| 2009/0024737 | A1* | 1/2009 | Goldspink et al. | 709/224 |
| 2009/0024748 | A1* | 1/2009 | Goldspink et al. | 709/228 |
| 2012/0095850 | A1* | 4/2012 | Hamel | 705/14.73 |
| 2012/0143713 | A1* | 6/2012 | Dittus et al. | 705/26.3 |
| 2013/0055384 | A1* | 2/2013 | Shulman et al. | 726/22 |
| 2013/0227078 | A1* | 8/2013 | Wei et al. | 709/219 |

OTHER PUBLICATIONS

A. Barth: "HTTP Statement Management Mechanism", IETF Trust Apr. 2011, http://tools.ietf.org/html/rfc6265, pp. 1-38.
"New net rules set to make cookies crumble", BBC News Technology, Mar. 7, 2011, http://www.bbc/do.uk/news/technology-12668552, pp. 1-4.
"Sen. Rockefeller: Get Ready for a Real Do-Not-Track, Bill for Online Advertising" May 6, 2011, http://adage.com/article/digital/sen-rockefeller-ready-a-real-track-bill/227426, pp. 1-4.
"HTTP_cookie", Wikipedia, the free encyclopedia, printed Mar. 15, 2012, http://en.wikipedia.org/wiki/HTTP_cookie, p. 18.
Adam L. Penenberg, "Cookie Monsters The innocuous text files that Web surfers love to hate", Nov. 7, 2005, http://www.slate.com/articles/technology/2005/11/cookie_monsters.html, pp. 1-7.
Thomas Frank, "Session variables without cookies", thomasfrank.se, Jan. 20, 2008, http://www.thomasfrant.se/sessionvars.html, p. 1.
"Sen. Rockefeller: Get Ready for a Real Do-Not-Track, Bill for Online Advertising" printed May 6, 2011, http://adage.com/article/digital/sen-rockefeller-ready-a-real-track-bill/227426, pp. 1-4.

(Continued)

*Primary Examiner* — Krisna Lim

(57) ABSTRACT

Cookies may be stored in the cloud, such as on one or more servers. A request, from a client, for a webpage, may be received and it may be determined whether the request includes a browser cookie that represents a key value that references state information relating to web browsing by the client. When the request is determined to include the browser cookie that represents the key value, at least a portion of the state information may be obtained using the key value. The webpage corresponding to the request may be determined based on the obtained state information. The webpage may be transmitted to the client. The transmitted webpage may include a new key value when the request does not include a key value.

22 Claims, 8 Drawing Sheets

(56) References Cited

OTHER PUBLICATIONS

"HTTP)cookie", Wikipedia, the free encyclopedia, printed Mar. 15, 2012, http://en.wikipedia.org/wiki/HTTP_cookie, p. 1.

Adam L. Penenberg, "Cookie Monsters The innocuous text files that Web surfers love to hate", printed Nov. 7, 2005, http://www.slate.com/articles/technology/2005/11/cookie_monsters.html, pp. 1-7.

* cited by examiner

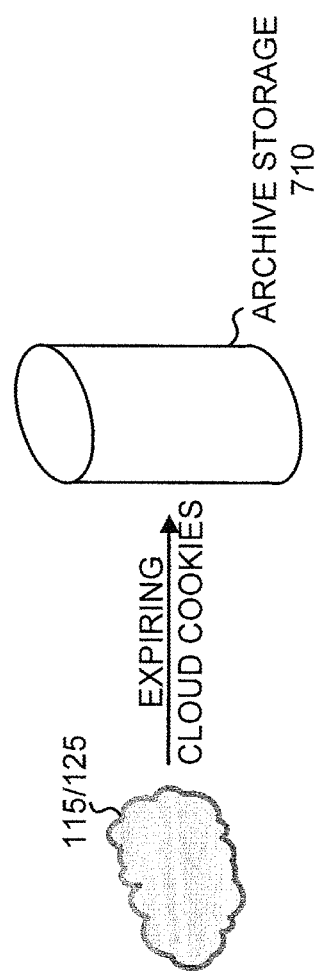

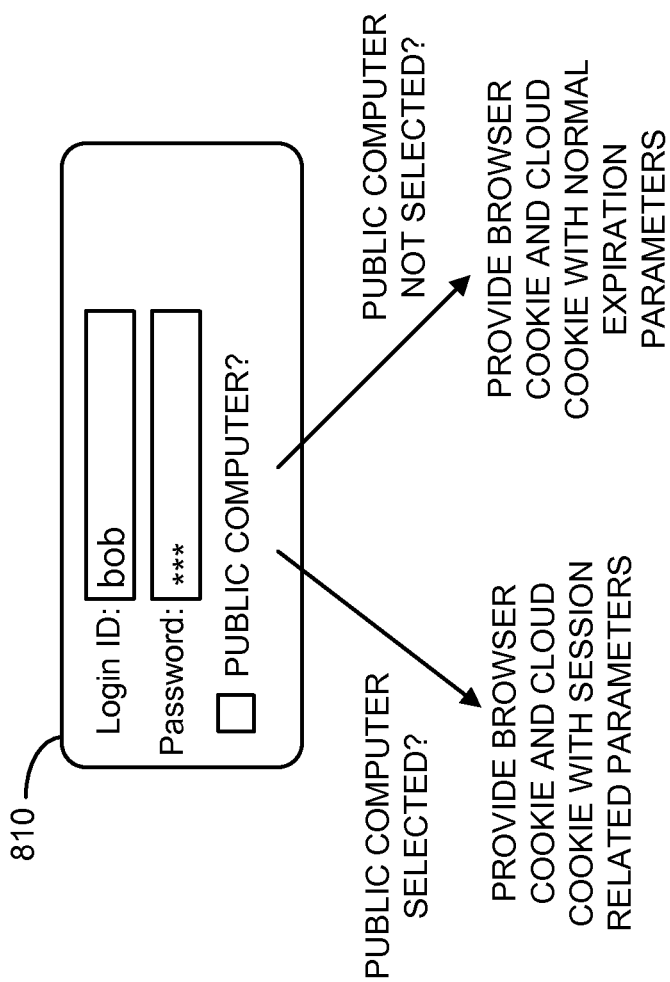

COOKIES STORED IN A CLOUD COMPUTING ENVIRONMENT

BACKGROUND

A browser cookie, also known as a web cookie or hypertext transfer protocol (HTTP) cookie, is a common technique for storing state information, generated by a web server, at a client device. The state information (i.e., the cookie) may be transmitted from the web server to a browser, at the client device, and stored by the browser in local storage of the client device. In subsequent requests from the browser to the web server, the browser may send the state information as part of the subsequent requests. The state information can be used for authentication, identification of a user session, user preference information, identification of shopping cart contents, or for other purposes that can be accomplished through the storing of text data on a user's computer (i.e., at the client device).

Cloud computing is the delivery of computing as a service rather than as a product, whereby shared resources, software, and information are provided to client devices (e.g., computers, smart phones, etc.) as a utility over a network, such as the Internet. Cloud computing environments provide computation, software, data access, and/or storage services that do not require end-user knowledge of a physical location and configuration of a system that delivers the services.

BRIEF DESCRIPTION OF THE DRAWINGS

FIG. 7 is a diagram illustrating the archiving of cloud cookies; and

FIG. 8 is a diagram illustrating processing relating to cloud cookie expiration for public sessions.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for the storage of cookies in a cloud computing environment or cloud (i.e., on one or more network servers). A number of state values, which may conventionally have been stored locally via browser cookies, may be stored at one or more network servers (e.g., in the cloud) and may be referred to as "cloud cookies" herein. A single session identifier may be stored as a local browser cookie. The session identifier may be used to associate the browser and a client device with the cloud cookies. In one implementation, a user of the client device may be given the option of whether to use cloud cookies or browser cookies.

Cloud cookies may provide a more secure technique to store state information than browser cookies, as the cloud cookies may be less vulnerable to security issues at the client device and the cloud cookies may not need to be transferred over an open network. In addition, cloud cookies may allow for centralized backup and/or archiving and centralized management of expired cookies.

Figure 1:
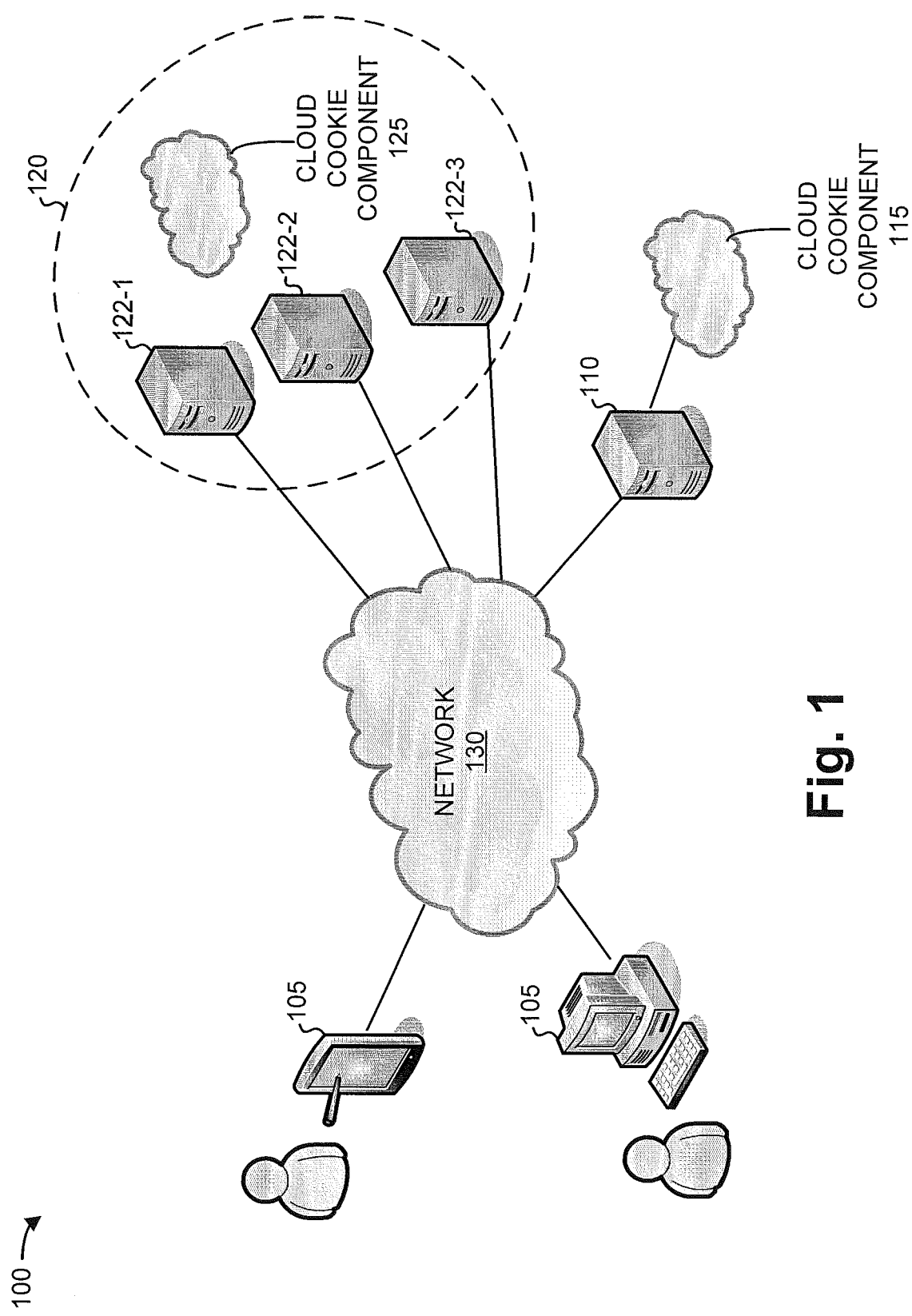
FIG. 1 is a diagram of an example environment in which systems and/or methods described herein may be implemented.

FIG. 1 is a diagram of an example environment 100 in which systems and/or methods described herein may be implemented. Environment 100 may include multiple clients 105 that can connect to a web server 110 and/or a server cluster 120 through a network 130. In one implementation, web server 110 and server cluster 120 may include web servers that provide documents, such as hypertext markup language (HTML) webpages, in response to requests from clients 105. Clients 105, web server 110, and server cluster 120 may connect to network 130 via wired, wireless, or a combination of wired and wireless connections.

Two clients 105, one web server 110, and one server cluster 120 are illustrated as connected to network 130 for simplicity. In practice, there may be additional clients 105 and/or web servers 110. Also, in some instances, a client 105 may perform one or more functions of a web server 110 and a web server 110 may perform one or more functions of a client 105.

Clients 105 may include devices of users that access web server 110 and/or server cluster 120. Client 105 may include, for instance, a personal computer, a wireless telephone, a personal digital assistant (PDA), a laptop, a smartphone, a tablet computer, or another type of computation and communication device. Client 105 may be particularly capable of accessing webpages provided by web server 110 and/or server cluster 120. For example, client 105 may execute a web browser and may request webpages from web server 110 and/or server cluster 120.

Web server 110 may include a server device, or some other type of computing device, that receives requests from clients 105 and responds to the requests with one or more webpages, such as HTML webpages. Although shown as a single server device in FIG. 1, web server 110 may, in some implementations, be implemented as multiple computing devices, which potentially may be geographically distributed.

When processing requests, from clients 105, for webpages, web server 110 may store and/or use state information. For example, web server 110 may store information for user authentication, identification of a user session, user preference information, or for other purposes. The state information may be stored by a cloud cookie component 115 associated with web server 110. Cloud cookie component 115 may include, for example, a database, a file server, a storage server, a network of storage servers, a memory, or another device that may be accessed by web server 110. Although shown in FIG. 1 as being separate from web server 110, cloud cookie component 115 may alternatively be implemented as part of web server 110.

Server cluster 120 may include a number of web servers 122-1 through 122-3 that receive requests from clients 105 and may respond to the requests with one or more webpages, such as HML webpages. When processing requests, from clients 105, for webpages, each of web servers 122-1 through 122-3 may store and/or use state information. State information may be stored by a cloud cookie component 125. Similar to cloud cookie component 115, cloud cookie component 125 may include, for example, a database, a file server, a storage server, a network of storage servers, a memory, or another device that may be accessed by web servers 122-1 through 122-3. Although shown in FIG. 1 as being separate from web servers 122-1 through 122-3, cloud cookie component 125 may alternatively be implemented as part of one or more of web servers 122-1 through 122-3.

In one implementation, server cluster 120 may correspond to a single primary domain, and each of web servers 122-1 through 122-3 may correspond to a subdomain of the primary domain. For example, server cluster 120 may correspond to the domain "examplecompany.com" and each of web servers 122-1 through 122-3 may correspond to the subdomains "examplecompany.com/onlinestore," "examplecompany.com/support," and "examplecompany.com/investorrelations," respectively. From the user's perspective, each subdomain may appear as a separate website. Web servers 122-1 through 122-3 may, however, be able to share the state information stored by cloud cookie component 125.

Network 130 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
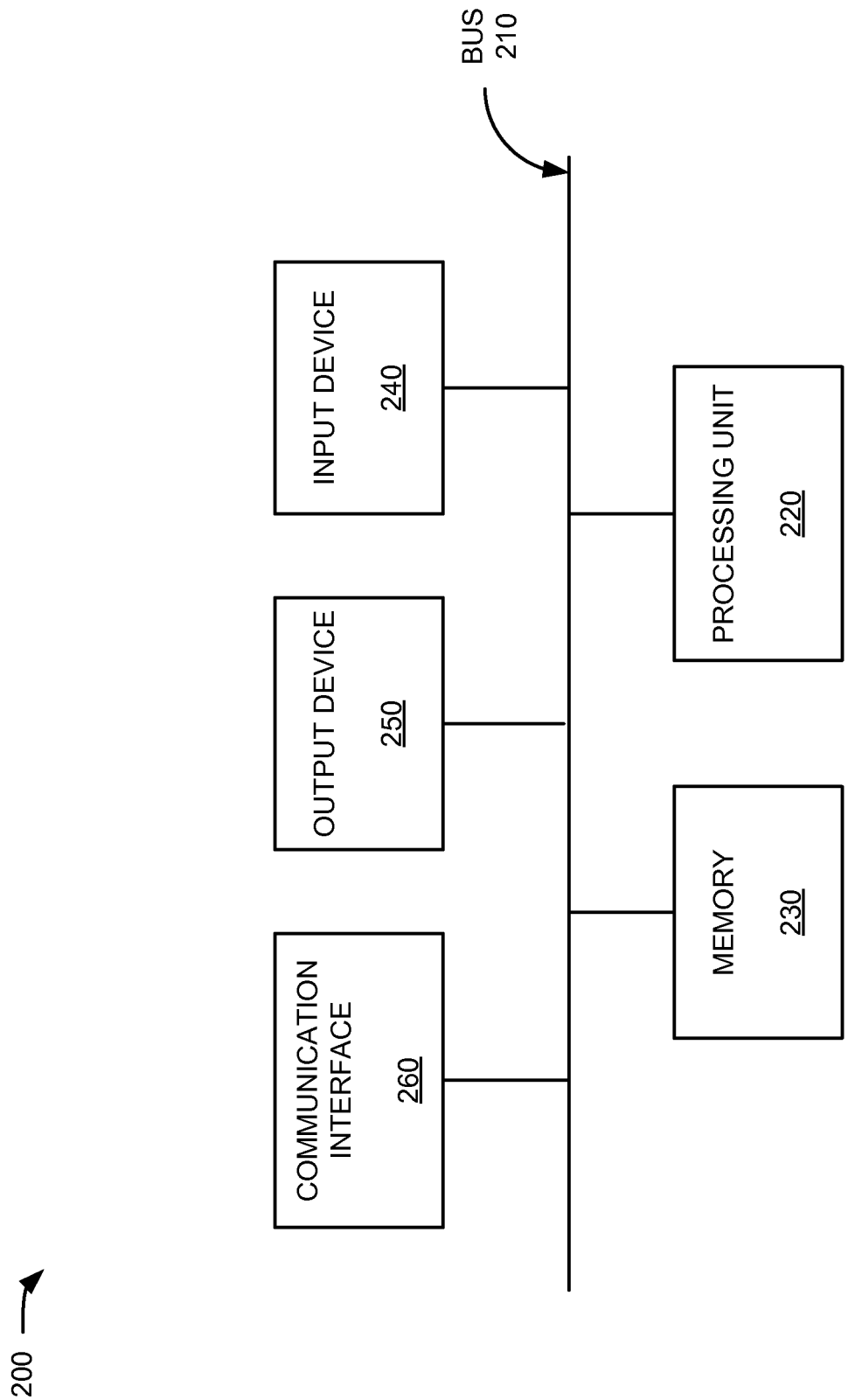
FIG. 2 is a diagram of example components of a device that may correspond to one or more devices of the environment of FIG. 1.

FIG. 2 is a diagram of example components of a device 200 that may correspond to one or more devices of environment 100, such as one of clients 105, web server 110, one of web servers 122, or one or more storage or computing devices in cloud cookie component 115/125. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices associated with environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
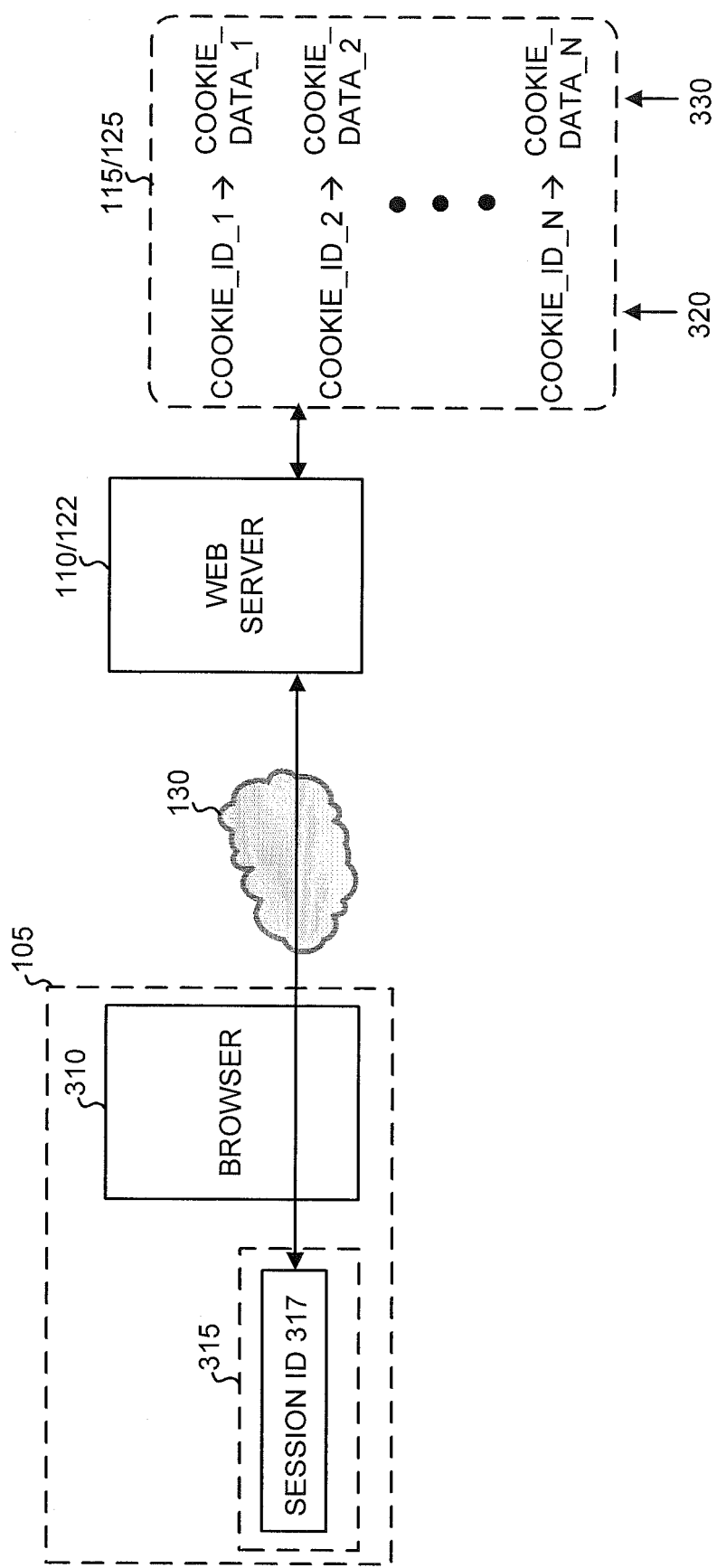
FIG. 3 is a diagram conceptually illustrating interactions of components in the environment of FIG. 1, relating to cloud cookies.

FIG. 3 is a diagram conceptually illustrating interactions of components, in environment 100, relating to cloud cookies. As shown, in FIG. 3, client 105 may be associated with a browser 310 and client local storage 315. Browser 310 may include a web browser program executing at client 105. Browser 310 may be configured to store browser cookies that are received from web servers 110/122.

As part of an initial request, such as a request for a webpage from a server (e.g., web server 110), browser 310 may transmit cookies, to web server 110, that were previously received from web server 110. In one example implementation, a single cookie may be transmitted to web server 110 by browser 310. The cookie may include a session identifier (ID) 317. In one example, text of session ID 310 may be a random or an arbitrary string that is used as a key to identify, in a cloud cookie component, such as cloud cookie component 115, the substantive state information for browser 310 (i.e., the substantive cloud cookie data). Session ID 317 may be stored in client local storage 315, such as on a local hard drive or other storage device at client 105.

Web server 110 may use session ID 317 to lookup state information in cloud cookie component 115. As illustrated in FIG. 3, cloud cookie component 115 may generally be implemented as a memory or other structure in which session IDs are used as keys to lookup the state information. A number of keys 320 (cookie_ID_1, cookie_ID_2, . . . , cookie_ID_N) are illustrated in FIG. 3. Each key 320 may be associated with corresponding state information 330 (cookie_data_1, cookie_data_2, . . . , cookie_data_N).

Although FIG. 3 shows example components in environment 100 relating to cloud cookies, in other implementations, environment 100 may contain fewer components, different components, differently arranged components, and/or additional components than those depicted in FIG. 3. Alternatively, or additionally, one or more components of environment 100 may perform one or more other tasks described as being performed by one or more other components of environment 100. Although web server 100 and cloud computing component 115 were described with respect to the description of FIG. 3, one of servers 122 and cloud computing component 125 could alternatively have been described.

Figure 4:
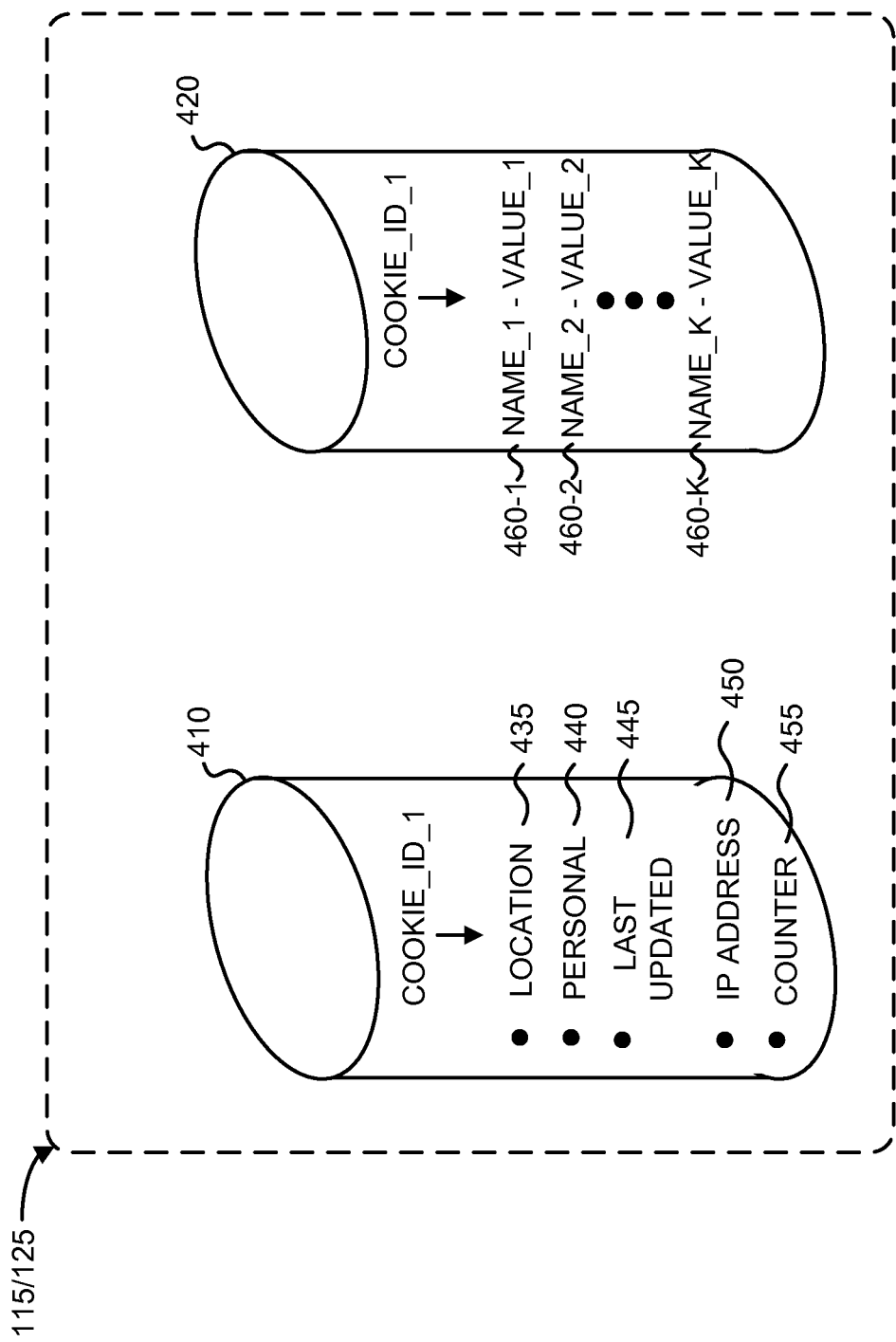
FIG. 4 is a diagram illustrating one example implementation of a cloud cookie component, as shown in FIG. 3.

In one implementation, cloud cookie component 115 may be divided into multiple logical sections, such as a first section that includes configuration information for the cloud cookies and a second section that includes the substantive user information for the cloud cookies. FIG. 4 is a diagram illustrating one example implementation of cloud cookie component 115/125 that includes a first section and a second section.

As shown in FIG. 4, a cloud cookie component, such as cloud cookie component 115/125, may include global storage 410 and main storage 420. Global storage 410 may generally store configuration information, administrative information, or other information. Global storage 410 may include a number of fields relating to the implementation of each cloud cookie. Global storage 410 may be implemented using a relatively fast storage technology, such as RAM or flash memory.

A number of example fields are illustrated, in FIG. 4, for global storage 410. These fields may include location field 435, personal field 440, last updated field 445, Internet Protocol (IP) address field 450, and counter field 455. Location field 435 may be a Boolean (yes/no) field that may be used to indicate whether a user's location was recently cleared or changed. Personal field 440 may be a Boolean field that indicates whether client 105 is a personal or public computing device. For example, when a user first logs onto web server 110, web server 110 may allow the user to select whether the computer that the user is using is a personal or public computer. This indication may be stored in personal field 440. Last updated field 445 may be set with the current date and time whenever a cloud cookie associated with a particular user is updated. As will be described in more detail below, last updated field 445 may be used to determine whether a cloud cookie has expired. IP address field 450 may store the IP address associated with client 105. Counter field 455 may be used to store a number of times that a particular cloud cookie is accessed. For example, each time a particular cloud cookie is accessed or each time a request corresponding to a particular cloud cookie is received from client 105, counter field 455 may be incremented.

Each of the fields in global storage 410 may be implemented on a per-cloud cookie basis. Thus, each cloud cookie may be associated with location field 435, personal field 440, last updated field 445, IP address field 450, and counter field 455. In one implementation, each session ID 317 (e.g., the session ID "COOKIE_ID_1") may be used as a key that references each set of fields 435-455.

Main storage 420 may store substantive information for each cloud cookie. In one implementation, main storage 420 may store the cloud cookies as extensible markup language (XML) documents, in which each entry for a cloud cookie may be stored as a name or key value and an associated substantive value (i.e., as name-value pairs). Storage techniques or structures other than XML may alternatively be used. Relative to global storage 410, main storage 420 may be implemented using a slower but more cost-effective storage technology. For example, main source 420 may be implemented as a relational database using disk storage.

A number of name-value pairs 460-1 through 460-K, associated with session ID 317 ("COOKIE_ID_1") are illustrated in main storage 420. Each name-value pair may include pairs of text data. For example, a shopping website may generate cloud cookies that store user shopping preferences. One name-value pair may include the name "currency" and the value "US Dollar," which may be a name-value pair indicating a user's currency preference. Each set of name-value pairs, stored in main storage 420 and associated with a session ID 317, may potentially be different from the set of name-value pairs associated with another session ID 317.

The fields, described above, for global storage 410 and main storage 420, are examples of possible fields that may be used. Alternative or additional fields may be used.

Figure 5:
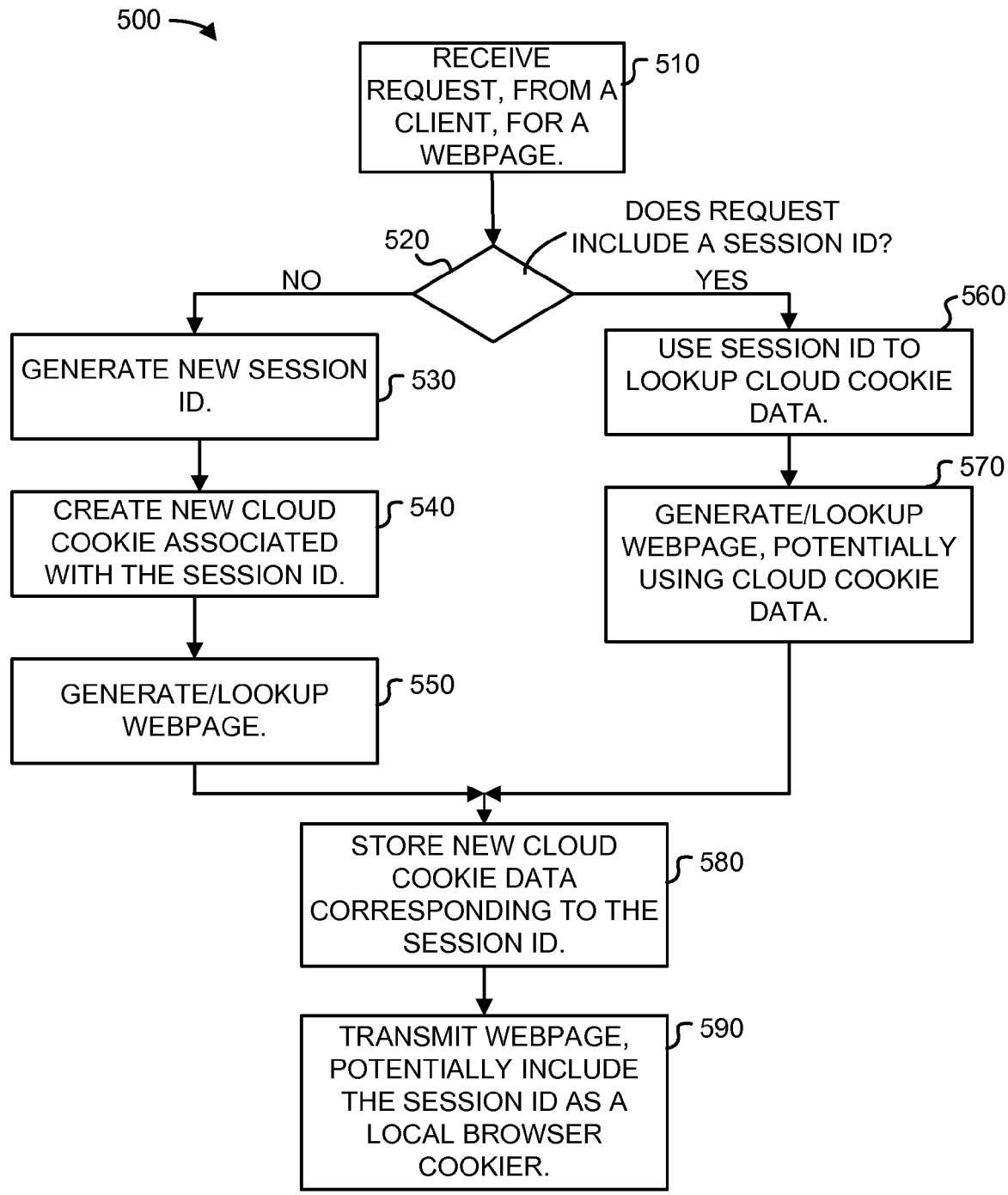
FIG. 5 is a flow chart illustrating an example process for implementing cloud cookies.

FIG. 5 is a flow chart illustrating an example process 500 for implementing cloud cookies. In one implementation, process 500 may be performed by one or more of web servers 110/122.

Process 500 may include receiving a request, from a client, for a webpage (block 510). A user of client 105 may, for example, enter an address, such as a uniform resource locator (URL), into a browser. The address may refer to one of web servers 110/122, such as web server 110. The browser may transmit the request to web server 110. As part of the request, the browser may transmit data (the browser cookie data) that was previously sent from web server 110 to the browser. The cookie data may include session ID 317.

In general, when a web server initially sets a cookie at a browser, the web server may define attributes of the cookie, such as the domain of the cookie, the path of the cookie, the expiration time of the cookie, and/or security attributes of the cookie. The domain and path may define the scope of the cookie, and may inform the browser when a particular cookie should be transmitted to the web server that provided the cookie. In one implementation, web servers 122, within server cluster 120, may set the domain and path attributes so that session ID 317, once set by one of web servers 122 at a browser, will be returned to any of web servers 122. In this manner, a cloud cookie may apply to any web server 122 within server cluster 120.

Process 500 may further include determining if the request includes session ID (block 520). If the request includes session ID 317, this may indicate that a cloud cookie was previously created for the browser. For web server 110, a request that includes session ID 317 may indicate that the combination of the browser and client 105, that transmitted the request, previously accessed web server 110. For one of web servers 122, a request that includes session ID 317 may indicate that the combination of the browser and client 105, that transmitted the request, previously accessed one of web servers 122.

Process 500 may further include, when the request is determined to not include a session ID (block 520—NO), generating a new session ID (block 530). The new session ID 317 may include, for example, a random or arbitrary string that may be used to uniquely identify a cloud cookie, associated with the browser, in cloud cookie component 115/125.

Process 500 may further include creating a cloud cookie associated with the newly generated session ID (block 540). For instance, web server 110 may request that cloud cookie component 115 instantiate a new cloud cookie, where the generated session ID 317 is used as a key to access the cloud cookie. In one implementation, and as described with reference to FIG. 4, cloud cookie component 115 may instantiate the cloud cookie in both global storage 410 and main storage 420. In alternative implementations, structures other than global storage 410 and main storage 420 may be used to implement the cloud cookie.

Process 500 may further include generating and/or looking up a webpage (block 550). The webpage may be, for example, a HTML webpage that is generated by web server 110.

Referring back to block 520, when the request, for the webpage, includes a session ID (block 520—YES), process 500 may include using the session ID to lookup the data associated with the cloud cookie (block 560). For example, web server 110 may request data, from cloud cookie component 115, for session ID 317. Cloud cookie component 115 may provide, to web server 110, the cloud cookie data for one or more fields from the cloud cookie. For example, cloud cookie component 115 may provide one or more values from global storage 410, one or more values from main storage 420, or one or more values from both global storage 410 and main storage 420. As one particular example, web server 110 may request one or more specific values, corresponding to specific names, of name-value pairs 460, from main storage 420 of cloud cookie component 115. Alternatively, web server 110 may request all of the name-value pairs, from cloud cookie component 115, for a session ID.

Process 500 may further include generating and/or looking up a webpage (block 570). The webpage may be, for example, a HTML webpage that is generated by one of web servers 110/122. The webpage may be generated using the cloud cookie data that was determined in block 560. For example, the webpage may be generated based on certain user preferences, as indicated by the cloud cookie data.

Process 500 may further include storing any new cloud cookie data corresponding to the session ID (block 580). During the process of generating the webpage, or based on information received in the request from the browser, web server 110 may determine that additional state information should be stored in the cloud cookie or that current state information in the cloud cookie should be modified. Web server 110 may correspondingly request that cloud cookie component 115 update or add new information to global storage 410 and/or main storage 420.

Process 500 may further include transmitting the webpage to the browser (block 590). The transmitted webpage may potentially include a request to store the session ID as a local browser cookie (block 590). The request to store session ID 317 as a local browser cookie may be made, by web server 110, when a new session ID 317 was generated or when attributes associated with a current session ID are to be modified. In one implementation, the request to store session ID 317 as a local browser cookie may include the browser cookie "secure" attribute. The secure attribute may mean that the browser cookie will only be provided by the browser when the browser is connected to web server 110 via a secure channel.

In some situations, a browser may include a user configurable parameter to allow a user to select whether to store cookies as cloud cookies or as local browser cookies. In this case, process 500 may only be implemented when the user has selected the option to store cookies as cloud cookies. Otherwise, the cookies may be stored as browser cookies.

It may be desirable to associate cookies, such as browser cookies or cloud cookies, with expiration dates. Cookies that outlive the corresponding expiration dates may be deleted. For a browser cookie, web server 110 may set an expiration attribute for the browser cookie, such as an absolute expiration date. The browser may delete the browser cookie after the absolute expiration date.

Figure 6:
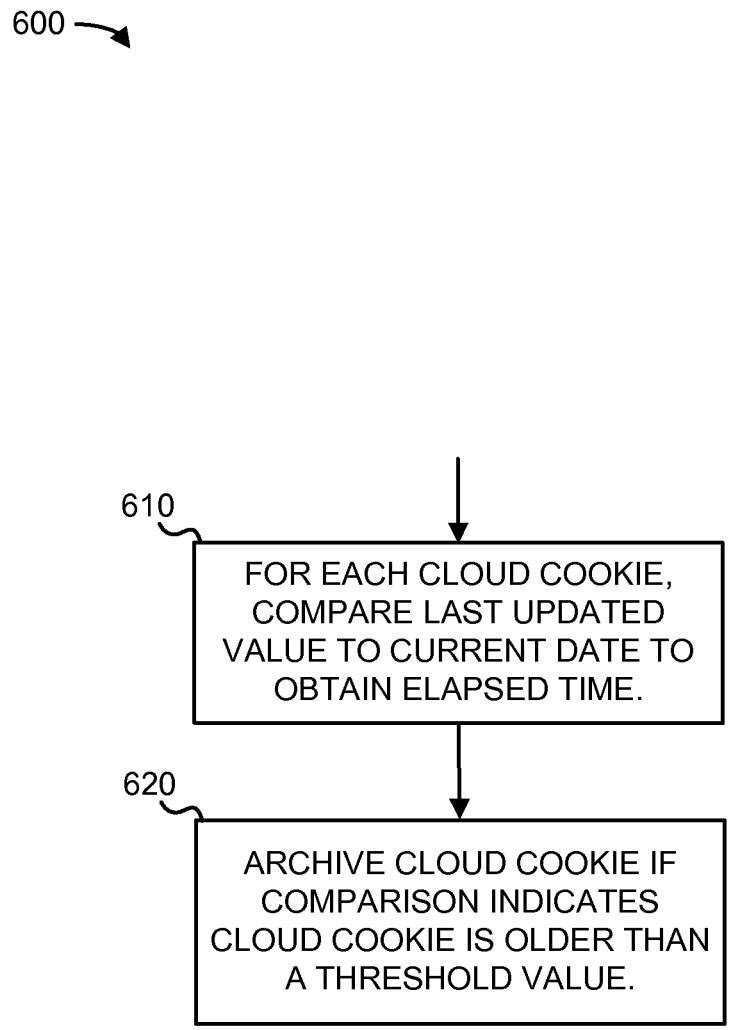
FIG. 6 is a flow chart illustrating an example process for handling the expiration of cloud cookies.

FIG. 6 is a flow chart illustrating an example process 600 for handling the expiration of cloud cookies. In one implementation, process 600 may be performed by one or more of web servers 110/122 or by cloud cookie component 115/125. Process 600 may be performed periodically or at various times. For example, process 600 may be performed daily by web servers 110/122.

In one implementation, expiration of cloud cookies may be determined based on the date at which the cloud cookie was last updated. As previously mentioned, global storage 410 may maintain a last updated field 445. Last updated field 445 may be modified to include the current date/time whenever the corresponding cloud cookie is accessed or modified.

Process 600 may include, for each cloud cookie, such as each cloud cookie stored by cloud cookies component 115/125, comparing the last updated date, of the cloud cookie, to the current date to obtain an elapsed time (block 610). The last updated date may be obtained from last updated field 445.

Process 600 may further include archiving the cloud cookie if the comparison, performed in block 610, indicates that the cookie is older than a threshold value (block 620). For example, the threshold value may be set at three months. In this situation, cloud cookies that have not been used in the last three months may be archived. As an alternative to archiving a cloud cookie, the cloud cookie may be deleted.

In an alternative implementation for handling expiration of cloud cookies, instead of comparing the last updated date to the current date, the last updated date or the current date may be compared to the creation date of the cloud cookie. The cloud cookie may be deemed to be expired when this comparison indicates that the age of the cloud cookie is greater than a threshold. For example, the cloud cookie expiration date may be set at three months from creation of the cloud cookie. Cookies older than three months may be deemed to have expired and may be archived or deleted.

In addition to updating cloud cookies based on user actions, in some implementations, the cloud cookies may be updated based on other events. For example, assume that server cluster 120 is administered by an entity, such as a telecommunications company. Customers of the telecommunications company may occasionally be requalified for different plans or services (e.g., a customer may become eligible for a new service). Cookies in cloud cookie component 125 may be updated to reflect the requalification. In this manner, when a user logs back in, to a server in server cluster 120, the user's account options may reflect the requalification.

It may be desirable for a cloud cookie to be associated with a user across top level domains. For example, it may be desirable for a single cloud cookie to be shared across web server 110 and server cluster 120. In one potential implementation, a browser, such as browser 310, may be configured to return a unique identifier for the browser (a "browser ID"). The browser ID may be used in place of session ID 317, which may allow cloud cookies to be shared across domains.

FIG. 7 is a diagram illustrating the archiving of cloud cookies. As previously discussed, with reference to block 620, cloud cookies may be archived upon expiration. Archiving a cloud cookie, as opposed to deleting it, may allow for analysis of historical user traffic and may enable the ability to restore cloud cookies that were erroneously determined to expire.

As shown in FIG. 7, archive storage 710 may be associated with or connected to cloud cookie component 115/125. Archive storage 710 may include nonvolatile computer memory, such as a disk drive or cluster of disk drives, into which cloud cookies may be stored. In one implementation, for each cloud cookie that is determined to be expired, cloud cookie component 115/125 may delete the cloud cookie from its local storage and may transmit a copy of the cloud cookie to archive storage 710. Expired cloud cookies may be stored in archive storage 710 for a particular period, such as six months or a year.

In some situations, it may be desirable for a newly created cloud cookie to be marked as a "session" cookie, in which the cloud cookie may be deleted or archived at the end of a user session. For example, a user may log into web server 110/122 from a public computer. In this case, it may be desirable to delete the browser cookie and the cloud cookie when the user logs off or closes the browser.

FIG. 8 is a diagram illustrating processing relating to cloud cookie expiration for public sessions. As shown in FIG. 8, a website or web server, such as one of web servers 110/122, may provide a webpage 810 to a user through which the user may indicate whether the user is at a public or private computer. Webpage 810 may be provided, for example, as part of an initial login process of a user to one of web servers 110/122. When the user indicates that the user is at a public computer, the browser cookie that is provided to client 105, and that may include session ID 317, may include an attribute that indicates that it is a session browser cookie. The web browser, at client 105, may delete the browser cookie when the user closes the browser or otherwise ends the session with web server 110/122. Similarly, web server 110/122 may delete the corresponding cloud cookie when the user ends the session with web server 110/122. In one implementation, for a computer indicated as a public computer, a user that explicitly logs out of a session may cause web server 110/122 to delete the corresponding cloud cookie. Alternatively or additionally, a computer indicated as a public computer may be given a cloud cookie expiration threshold that is relatively short, such as 30 minutes or an hour. Accordingly, even if the user does not explicitly log out of a session or web server 110/122 is not able to detect the user leaving the public computer or closing the browser, the cloud cookie may still be deleted relatively quickly.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more devices, the method comprising:
   receiving, by the one or more devices and from a client, a request for a webpage;
   determining, by the one or more devices, whether the request includes a browser cookie that represents a session identifier that identifies a network browser cookie that stores information relating to web browsing by the client;
   obtaining, by the one or more devices and when the request is determined to include the browser cookie, at least a portion of the network browser cookie, the at least a portion of the network browser cookie being obtained, from a network storage device different from the client, using the session identifier;
   identifying, by the one or more devices and when the request is determined to not include the browser cookie, a new session identifier;
   determining, by the one or more devices, the webpage corresponding to the request, the webpage being determined based on the obtained network browser cookie when the request includes the browser cookie that represents the session identifier; and
   transmitting, by the one or more devices, the webpage to the client, the transmitting to the client additionally including, when the new session identifier has been identified, the new session identifier.

2. The method of claim 1, further comprising:
   determining expiration of the network browser cookie, for the client, based on a comparison of an age of the network browser cookie to a threshold value; and
   archiving the network browser cookie when the age of the network browser cookie is greater than the threshold value.

3. The method of claim 1, further comprising:
   determining the new session identifier as random or arbitrary identification text.

4. The method of claim 1, further comprising:
   transmitting the new session identifier to the client as a browser cookie that includes attributes to indicate that the new session identifier is to be transmitted to any web server associated with a domain of the one or more devices.

5. The method of claim 1, where the one or more devices include web servers.

6. The method of claim 1, further comprising:
   storing the network browser cookie in a first memory structure and a second memory structure,
   the first memory structure being implemented to provide fast access to administrative or configuration information relating to the network browser cookie, and
   the second memory structure being implemented to provide substantive data relating to the network browser cookie.

7. The method of claim 6, where the administrative or configuration information includes:
   a field indicating whether the client is a personal or public computer, and
   a field indicating a last update date for the network browser cookie.

8. The method of claim 1, further comprising:
   providing an interface to the client to determine whether the client is a public computer; and
   setting, when the client is determined to be a public computer, an expiration period of the network browser cookie to a value that results in expiration of the network browser cookie at a completion of a browsing session.

9. One or more devices, comprising:
one or more processors to:
receive, from a client, a request for a webpage;
determine whether the request includes a browser cookie that represents a session identifier that identifies a network browser cookie that stores information relating to web browsing by the client;
obtain, when the request is determined to include the browser cookie, at least a portion of the network browser cookie, the at least a portion of the network browser cookie being obtained using the session identifier to lookup the network browser cookie from a network storage device different from the client;
identify, when the request is determined to not include the browser cookie, a new session identifier;
determine the webpage corresponding to the request, the webpage being determined based on the obtained network browser cookie when the request includes the browser cookie; and
transmit the webpage to the client, the transmitting to the client additionally including, when the new session identifier has been identified, the new session identifier.

10. The one or more devices of claim 9, where the one or more processors are further to:
determine expiration of the network browser cookie, for the client, based on a comparison of an age of the network browser cookie to a threshold value; and
archive the network browser cookie when the age of the network browser cookie is greater than the threshold value.

11. The one or more devices of claim 9, where the one or more processors are further to:
determine the new session identifier as random or arbitrary identification text.

12. The one or more devices of claim 9, where the one or more processors are further to:
transmit the new session identifier to the client as a browser cookie that includes attributes to indicate that the new session identifier is to be transmitted to any web server associated with a domain of the one or more devices.

13. The one or more devices of claim 9, where the one or more processors are further to:
store the network browser cookie in a first memory structure and a second memory structure,
the first memory structure being implemented to provide fast access to administrative or configuration information relating to the network browser cookie, and
the second memory structure being implemented to provide substantive data relating to the network browser cookie.

14. The one or more devices of claim 13, where the administrative or configuration information includes a field indicating whether the client is a personal or public computer and a field indicating a last update date for the network browser cookie.

15. The one or more devices of claim 9, where the one or more processors are further to:
provide an interface to the client to determine whether the client is a public computer; and
set, when the client is determined to be a public computer, an expiration period of the network browser cookie to a value that results in expiration of the network browser cookie when the user completes a browsing session.

16. A non-transitory computer-readable medium, comprising:
one or more instructions that, when executed by one or more processors of a device, cause the one or more processors to:
receive, from a client, a request for a webpage;
determine whether the request includes a browser cookie that represents a session identifier that identifies a network browser cookie that stores information relating to web browsing by the client;
obtain, when the request is determined to include the browser cookie, at least a portion of the network browser cookie, the at least a portion of the network browser cookie being obtained from a network storage device different from the client, using the session identifier to lookup the network browser cookie;
identify, when the request is determined to not include the browser cookie, a new session identifier;
determine the webpage corresponding to the client request, the webpage being determined based on the obtained network browser cookie when the request includes the browser cookie that represents the session identifier; and
transmit the webpage to the client, the transmitting to the client additionally including, when the new session identifier has been identified, the new session identifier.

17. The non-transitory computer-readable medium of claim 16, further comprising:
one or more instructions that, when executed by the one or more processors, cause the one or more processors to:
determine expiration of the network browser cookie, for the client, based on a comparison of an age of the network browser cookie to a threshold value; and
archive the network browser cookie when the age of the network browser cookie is greater than the threshold value.

18. The non-transitory computer-readable medium of claim 16, further comprising:
one or more instructions that, when executed by the one or more processors, cause the one or more processors to:
determine the new session identifier as random or arbitrary identification text.

19. The non-transitory computer-readable medium of claim 16, further comprising:
one or more instructions that, when executed by the one or more processors, cause the one or more processors to:
transmit the new session identifier to the client as a browser cookie that includes attributes to indicate that the new session identifier is to be transmitted to any web server associated with a domain of the one or more devices.

20. The non-transitory computer-readable medium of claim 16, further comprising:
one or more instructions that, when executed by the one or more processors, cause the one or more processors to:
store the network browser cookie in a first memory structure and a second memory structure, the first memory structure being implemented to provide fast access to administrative or configuration information relating to the network browser cookie and the second memory structure being implemented to provide substantive data relating to the network browser cookie.

21. The non-transitory computer-readable medium of claim 16, where the administrative or configuration information includes a field indicating whether the client is a personal or public computer and a field indicating a last update date for the network browser cookie.

22. The non-transitory computer-readable medium of claim 16, further comprising:
   one or more instructions that, when executed by the one or more processors, cause the one or more processors to:
      provide an interface to the client to determine whether the client is a public computer; and
      set, when the client is determined to be a public computer, an expiration period of the network browser cookie to a value that causes expiration of the network browser cookie when the user completes a browsing session.

* * * * *